(12) United States Patent
Foster

(10) Patent No.: US 6,797,241 B2
(45) Date of Patent: Sep. 28, 2004

(54) NON-THERMAL PLASMA REACTOR HAVING INDIVIDUALLY RETAINED POSITIVE AND NEGATIVE REACTOR PLATES

(75) Inventor: Michael Ralph Foster, Columbiaville, MI (US)

(73) Assignee: Delphi Technologies, Inc., Troy, MI (US)

( * ) Notice: Subject to any disclaimer, the term of this patent is extended or adjusted under 35 U.S.C. 154(b) by 666 days.

(21) Appl. No.: 09/742,674

(22) Filed: Dec. 20, 2000

(65) Prior Publication Data

US 2002/0076371 A1 Jun. 20, 2002

(51) Int. Cl.$^7$ .............................................. B01J 19/08
(52) U.S. Cl. ................................................. 422/186.04
(58) Field of Search ................................... 422/186.04

(56) References Cited

U.S. PATENT DOCUMENTS

| | | | |
|---|---|---|---|
| 3,141,795 A | * | 7/1964 | Eisler ........................ 429/154 |
| 3,663,721 A | * | 5/1972 | Blondel et al. ............. 429/131 |
| 6,338,827 B1 | | 1/2002 | Nelson et al. |
| 6,354,903 B1 | | 3/2002 | Nelson |
| 6,368,451 B1 | | 4/2002 | Goulette et al. |
| 6,423,190 B2 | | 7/2002 | Hemingway et al. |
| 6,455,014 B1 | * | 9/2002 | Hammerstrom et al. ........................ 422/186.04 |
| 6,464,945 B1 | | 10/2002 | Hemingway |
| 6,482,368 B2 | | 11/2002 | Hemingway et al. |
| 6,537,507 B2 | | 3/2003 | Nelson et al. |
| 6,638,484 B2 | | 10/2003 | Nelson et al. |

* cited by examiner

*Primary Examiner*—Kishor Mayekar
(74) *Attorney, Agent, or Firm*—Paul L. Marshall

(57) ABSTRACT

A non-thermal plasma reactor and method provides individually retained reactor plates. The method comprises stacking an alternating sequence of positive and negative reactor plates to form a reactor stack, placing temporary spacers between the positive and negative reactor plates. In one embodiment, individually retained reactor plates are secured by folds of a ceramic insulating layer extending between plate pairs, with reactor plates secured by the stack retention material and the folds of the ceramic insulting layer. In a second embodiment, individually retained reactor plates are secured with a permanent pleated insulting mica separator disposed on each side of the reactor. In a third embodiment, a retention material extends slightly into the exhaust gas passage at each side of the stack supplying permanent support for the stacked plates.

12 Claims, 4 Drawing Sheets

US 6,797,241 B2

NON-THERMAL PLASMA REACTOR HAVING INDIVIDUALLY RETAINED POSITIVE AND NEGATIVE REACTOR PLATES

TECHNICAL FIELD

The present invention relates to exhaust treatment devices and more particularly relates to parallel plate non-thermal plasma reactors.

BACKGROUND OF THE INVENTION

Certain compounds in the exhaust stream of a combustion process, such as the exhaust stream from an internal combustion engine, are undesirable in that they must be controlled in order to meet government emissions regulations. Among the regulated compounds are hydrocarbons, soot particulates, and nitrogen oxide compounds (NOx). There are a wide variety of combustion processes producing these emissions, for instance, coal- or oil-fired furnaces, reciprocating internal combustion engines (including gasoline spark ignition and diesel engines), gas turbine engines, and so on. In each of these combustion processes, control measures to prevent or diminish atmospheric emissions of these emissions are needed.

An alternative way to treat the hydrocarbon, particulate, or NOx emissions in an exhaust or effluent stream would be to destroy such emissions using a non-thermal plasma. Plasma is regarded as the fourth state of matter (ionized state of matter). Unlike thermal plasmas, non-thermal plasmas (NTPs) are in gaseous media at near-ambient temperature and pressure but have electron mean energies considerably higher than other gaseous species in the ambient environment. NTP species include electrically neutral gas molecules, charged particles in the form of positive ions, negative ions, free radicals and electrons, and quanta of electromagnetic radiation (photons). These NTP species are highly reactive and can convert hazardous gases to non-hazardous or less hazardous and easily managed compounds through various chemical reaction mechanisms. In contrast to thermal processes (such as thermal plasma), an NTP process directs electrical energy to induce favorable gas chemical reactions, rather than using the energy to heat the gas. Therefore, NTP is much more energy-efficient than thermal plasma.

NTPs can be generated by electric discharge in the gas or injection of electrons into the gas by an electron beam. Electron beams must be accelerated under a high vacuum and then transferred through special windows to the reaction site. The reaction site must be sized with respect to the penetration depth of the electrons. It is much more difficult to scale-up the size of an electron beam reactor than an electric discharge reactor. Therefore, electron beam reactors are less favored than electric discharge reactors.

Among the various types of electric discharge reactors, pulse corona and dielectric barrier (silent) discharge reactors are very popular for their effectiveness and efficiency. However, pulse corona reactors have the major disadvantage of requiring special pulsed power supplies to initiate and terminate the pulsed corona. Consequently, dielectric barrier discharge has become a fast growing technology for pollution control.

Cylindrical and planar reactors are two common configurations for dielectric barrier discharge reactors. Both of these configurations are characterized by the presence of one or more insulating layers in a current path between two metal electrodes, in addition to the discharge space. Other dielectric barrier discharge reactors include packed-bed discharge reactors, glow discharge reactors, and surface discharge reactors.

A variety of known dielectric barrier discharge NTP reactor designs are based upon the use of one or more structural dielectric ceramic pieces coated with a conductive material arranged to form the dielectric barrier-conductor-dielectric barrier configurations ("parallel plate" reactors). Preparation of parallel plate NTP reactors typically involves pre-assembling the reactor stack by stacking alternating positive and negative plates, using ceramic spacers to separate and retain the plates. The ceramic spacers further serve to determine exhaust passage dimensions. A glass retaining material is typically applied at the reactor edges to produce a rigid one-piece assembly. The reactor assembly is in turn wrapped with a ceramic retention material, such as an intumescent mat, and stuffed into a cylindrical housing.

Problematically, the ceramic spacers must be individually placed and retained to separate the stacked plates. The lack of an insulating feature in the plate/spacer design requires separating the electrode from the edge of the dielectric by a wide margin, such as about 19 mm, to prevent surface conduction of electric energy through the gap of the plates thereby reducing overall reactor performance. Further, the ceramic spacers contribute to the overall height variation of the reactor assembly due to large thickness variation of the spacers, making it difficult to fit the assembly into the housing. The gap variations from cell to cell further reduce reactor performance by reducing or prohibiting plasma production resulting in so-called "inter and or intra-dark cells".

What is needed in the art is an improved non-thermal plasma reactor and method of producing same. What is further needed in the art is a NTP reactor that can be produced at reduced cost while providing improved reactor performance.

SUMMARY OF THE INVENTION

A non-thermal plasma reactor having individually retained plates and a method for preparing same is provided. One embodiment of the method comprises stacking an alternating sequence of positive and negative pairs of reactor plates to form a reactor stack having exhaust gas passages defined between opposing pairs of plates, using temporary spacers between opposing polarity pairs of said positive and negative reactor plates to support the stacked plates.

In a first embodiment, an insulating layer comprising, for example, a ceramic insulating fiber, is disposed on either side of the stack, and the stack is compressed. During compressing, the insulating layers fold a distance into the exhaust passage, providing insulating and support function. In this embodiment, the temporary spacers define the height of the exhaust gas passage. The reactor stack is wrapped with an insulating retention material, suitable electrical connections are provided to the plates, the temporary spacers are removed, and suitable inlet and outlet connections are provided to the reactor housing. The reactor plates in this embodiment are secured by the insulating retention material, enabling the plates to expand or contract independently of one another during operation. During operation, the reactor is powered with high voltage alternating current forming a non-thermal plasma in the exhaust passages for treating constituents present in an exhaust stream passing through the exhaust passages.

In a second, preferred embodiment, a permanent pleated insulating separator is disposed on each side of the stack, such that each pleat separates a pair of positive plates from a pair of negative plates. The temporary spacers have a thickness selected to effect a temporary spacing between the plates providing easy insertion of the permanent pleated insulating separators disposed on each side of the spaced reactor plates. In this preferred embodiment, the permanent pleated separators provide excellent durability by maintaining the spacing between the reactor plates in combination with a retention mat that is wrapped around the stack.

The temporary spacers are removed, and the stack is compressed to secure and compact the pleats of the permanent insulating separators. The permanent pleated insulating separators extend a distance into the exhaust passage, providing insulating and support function, and defining the exhaust gas passage height.

Suitable electrical connections may be made to the plates and the reactor stack is wrapped using a resilient retention material. The reactor assembly further comprises inserting the wrapped stack into a reactor housing by a stuffing operation, adding the required electrical connections and inlet-outlet connections to the reactor housing to prepare the present non-thermal plasma reactor. The reactor plates in this preferred embodiment are secured by the insulating retention material, and additional spacing and support function is provided by the permanent pleated insulating separators, enabling the plates to expand or contract independently of one another during operation.

In a third embodiment, an alternating sequence of positive and negative pairs of reactor plates are stacked to form a reactor stack having exhaust gas passages defined between opposing pairs of plates, using temporary spacers between opposing polarity pairs of said positive and negative reactor plates to support the stacked plates during preparation. A retention material, such as a ceramic fiber retention mat, is disposed about the stack. In this embodiment, permanent support for the stacked plates is supplied from the retention mat, which, upon compressing, extends slightly into the exhaust gas passages at each side of the stack.

Non-thermal plasma reactors prepared in accordance with the present method allow ease of manufacture at reduced cost due to the elimination of costly permanent ceramic spacers and edge assembly retention with glass cement. The reactor plates are individually retained, having the ability to expand and contract independently. Therefore, stack breakage due to cracking of the glass cement during assembly and plate breakage due to thermal stress caused by one plate expanding or contracting more than the other is greatly reduced or eliminated. Improved reactor performance is provided through elimination of the occurrence of "dark" cells resulting from permanent ceramic spacers as well as through improved dimensional control. The present non-thermal plasma reactor and method provides improved dimensional control over stack height by using permanent pleated separators or insulating layers comprising an insulating material having very little thickness variation along the length of each piece.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several figures.

DESCRIPTION OF THE PREFERRED EMBODIMENT

Figure 1:
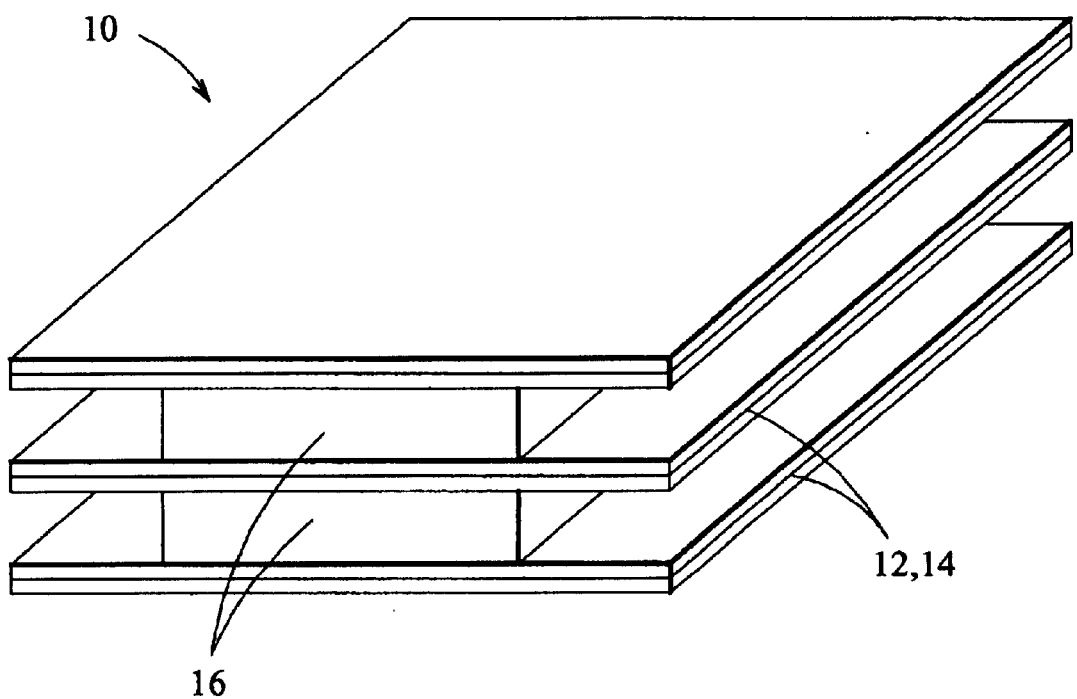
FIG. 1 shows a perspective view of the present method including a plurality of stacked plates having a temporary spacer disposed between opposing pairs of plates.

The present parallel plate non-thermal plasma reactors provide individually retained positive and negative reactor plates. Turning to FIG. 1, a front inlet view shows a portion of a reactor stack 10 during assembly. The stacking step is represented by an alternating sequence of three pairs of opposing polarity plates 12, 14. A stack for treating automotive emissions typically has numerous sets of plates depending on vehicle emission requirements. The reactor plates 12, 14 may comprise any suitable configuration known in the art, such as structural dielectric ceramic pieces coated with a conductive material (electrode) and arranged to form a dielectric barrier-conductor-dielectric barrier plate. Preferably, the coating pattern provides an electrode that is set back a distance from each end or each side of the dielectric piece, except for the terminating connections which are widely separated from each other. This prevents shorting between opposing polarity plates at the edges.

The pairs of plates 12, 14 are separated using a temporary removable spacer 16 between adjacent pairs of plates 12, 14. An alternate embodiment includes controlling the plate spacing using a two stage spacing method. In this way, a first stage spaces the pairs of plates 12, 14 at a first distance suitable for preparing said reactor stack; and a second stage spaces the pairs of plates 12, 14 at a second distance suitable for canning the element into a housing. The temporary spacer used in this embodiment may be, for example, a collapsible temporary spacer configured to set a first spacing for the first stage and to collapse to set a second spacing for the canning operation. Alternately, two differentially sized temporary spacers may be used.

Figure 2:
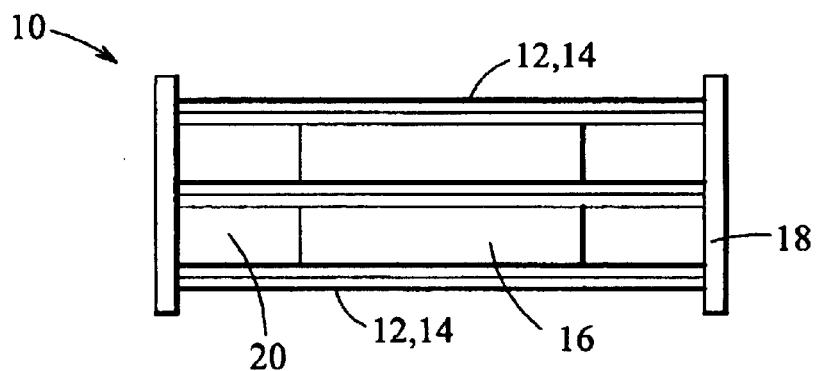
FIG. 2 shows a perspective view of a plurality of stacked plates having an insulating layer disposed on either side of the stack.

FIG. 2 shows an insulating layer 18 disposed on opposite sides of the stacked plates 12, 14 in accordance with a first embodiment of the present invention. The temporary spacer 16 supports the stacked plates 12, 14 and temporarily defines the height of the exhaust passage. In this embodiment, the spacer 16 holds the stacked reactor plates 12, 14 at the suitable spacing until the plates 12, 14 are retained by the ceramic mounting material used to secure the reactor stack to the reactor housing (not shown in FIG. 2). In this embodiment, the temporary spacers 16 preferably comprise a one piece tool that is preferably connected to an air cylinder or other such source provided to pull the temporary spacer-tool assembly from the reactor housing assembly. The one-piece tool comprises, for example, an array of connected plates made of hardened tool steel having a one-piece design, mounted on the machine. After inserting the stack in the housing, the machine withdraws the tooling from the bottom of the reactor.

Figure 3:
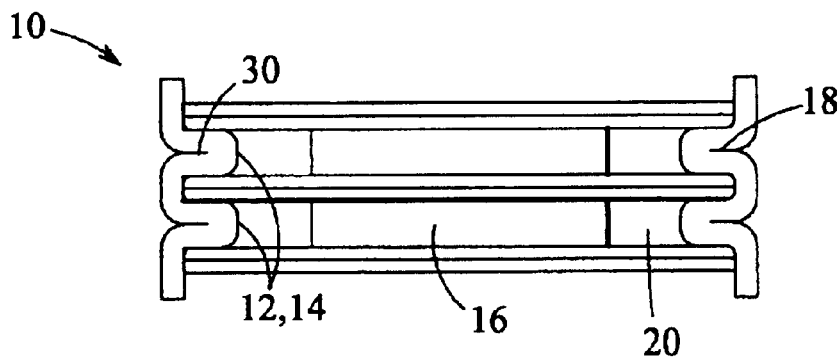
FIG. 3 shows a perspective view of the stack of FIG. 2, after compressing.

During compressing, the insulating layer 18 is folded inward in an accordion fashion into the exhaust passages 20, the folds 30 providing insulation and additional permanent support to the reactor plates 12, 14. In one embodiment, the insulating layer 18 comprises an insulating ceramic fiber. Preferably, the insulating ceramic fiber comprises a material having a density sufficient to withstand wind erosion of the retention mat (28 shown in FIGS. 7 and 8). In another embodiment the insulating layer comprises a "green" layer of tape cast ceramic material. In FIG. 3, the embodiment of FIG. 2 is shown after compressing with the insulating layers 18 at either side of the compressed stacked plates 12 extended a distance into the exhaust passages 20.

Optionally, a rigid plate, such as a mica plate, may be disposed at the top and bottom ends of the reactor stack.

Figure 7:
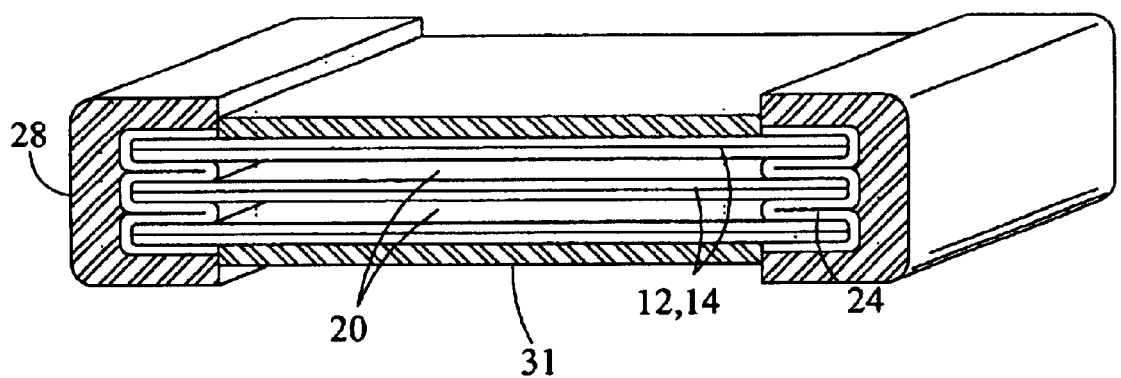
FIG. 7 shows a perspective view of the subassembly of FIG. 6 after wrapping with a retention mat and adding rigid insulating "fillers" to prevent exhaust gases from by-passing the reactor.

The separated, compressed plates 12, 14 are wrapped with a retention mat (such as retention mat 28 shown in the embodiment of FIG. 7). The insulating spacing layer 18 is secured by the folds 30 and plates 12, 14 on one side and by the retention mat 28 on the opposite, reactor edge side. Individual pairs of plates 12, 14 are able to expand or contract independently of one another thereby reducing the possibility of thermal stress induced reactor plate breakage during operation.

Figure 4:
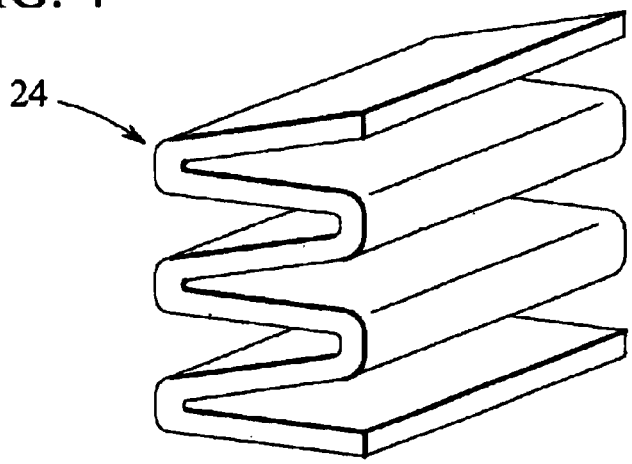
FIG. 4 shows a perspective view of a pleated mica sheet used to provide a permanent insulating separator in accordance with a preferred embodiment of the present invention.

In a preferred embodiment, a permanent pleated insulating separator 24 is disposed on either side of the stacked plates 12, 14. The permanent insulating separator 24 is preferably folded or pleated as shown in FIG. 4. The separator 24 may comprise any suitable insulating material that can be folded or pleated, including, but not limited to, mica, Cogebi 132P mica, tape-cast ceramic material in the "green" state, molded rigidized ceramic fiber or other material having suitable structural and insulating properties.

The permanent insulating separator 24 most preferably comprises a mica sheet, such as a Cogebi 132P mica sheet, having a thickness selected according to the reactor size and system demand. The mica sheet will typically have a thickness of about 0.2 mm to about 0.75 mm. The mica sheet is folded to form the permanent pleated insulating separator 24.

In this embodiment, the permanent pleated insulating separator 24 sets the exhaust passage 20 height. During compressing, the permanent pleated insulating separator 24 pleats are compacted together within each exhaust passage 20, setting the height of the passages 20. For example, when a permanent pleated insulating separator 24 having a thickness of 1 millimeter is disposed between opposing polarity paired plates 12, 14 each pleated fold is compacted upon compressing to provide exhaust passages 20 having a height of very slightly less than about 2 millimeters.

In an alternate embodiment, a plurality of discrete folded permanent insulating separators are provided to separate individual pairs of positive and negative plates 12, 14. The discrete permanent insulating separators may comprise a preformed shaped one-piece design.

Figure 5:
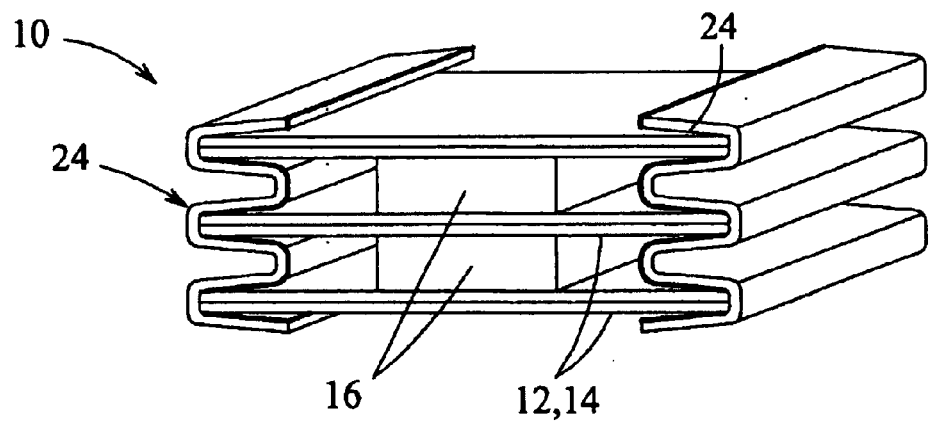
FIG. 5 shows a perspective view of the stack of FIG. 1 having a permanent insulating mica separator disposed on either side of the stack in accordance with a preferred embodiment of the present invention.

FIG. 5 shows the separated stack of reactor plates 12, 14 of FIG. 1 having a permanent pleated insulating separator 24 disposed on each side of the stacked reactor plates 12, 14 such that one folded pleat is inserted between opposing polarity paired plates 12, 14 on each side.

Figure 6:
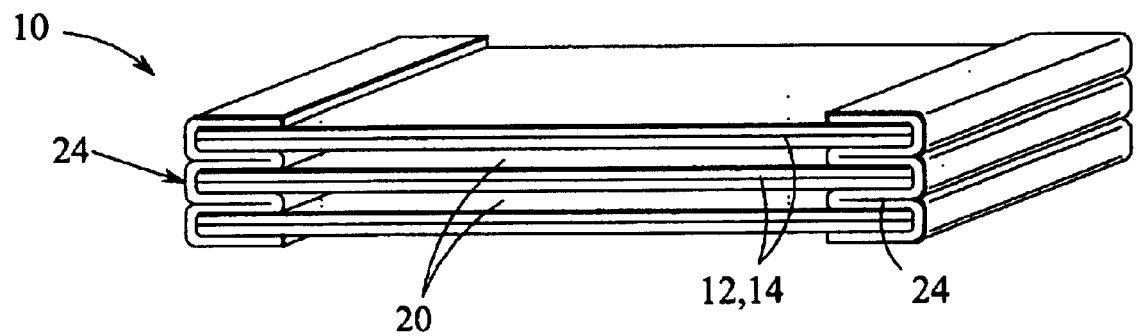
FIG. 6 shows a perspective view of a reactor subassembly, after compressing and removal of the temporary spacers, prior to wrapping, in accordance with a preferred embodiment of the present invention.

FIG. 6 shows the stack of reactor plates 12, 14 of FIG. 5 after the temporary spacers 16 have been removed, and the stack of plates 12, 14 having permanent mica separators 24 has been lightly compressed.

The temporary spacers 16 used with the mica separators are preferably a one piece tool 16 that serves to temporarily hold the plates 12 in the proper orientation so the folded and pleated mica separator 24 could be readily added to each side of the reactor plates 12. The tool 16 is removed and may be used to assemble another reactor. Alternately, the reactor plates 12 and mica sub-assembly is removed from the tool 16.

Turning to FIG. 7, the separated, compressed plates 12 are wrapped with a retention mat 28. Preferably, a rigid ceramic insulating filler 31 is disposed at top and bottom ends of the stack plates 12. The rigid insulating fillers 31 serve to prevent exhaust gases from bypassing the reactor.

Figure 8:
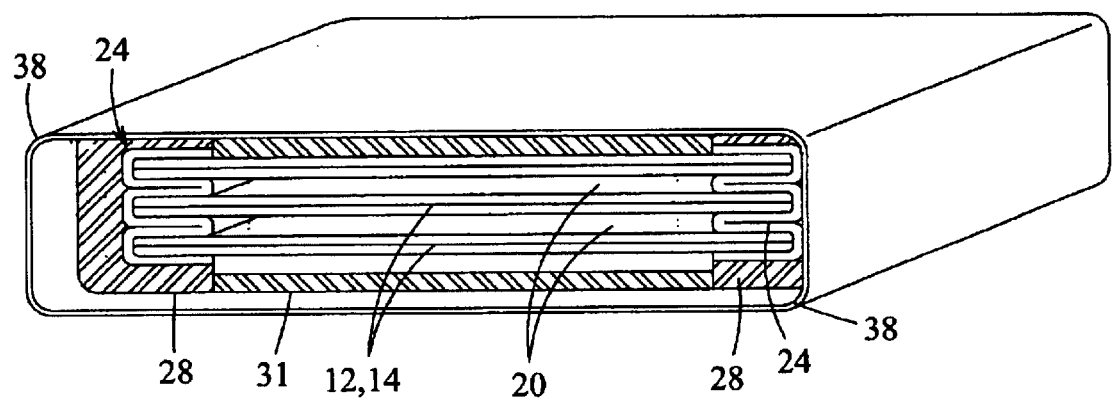
FIG. 8 shows the wrapped reactor element of FIG. 7 after inserting into a housing.

Reactor assembly further comprises stuffing the wrapped stack into a housing 38, typically a cylindrical housing. FIG. 8 depicts the embodiment of FIG. 7 with temporary spacers 16 removed from between the positive and negative sandwiched plates 12, 14. In the preferred embodiment using permanent pleated insulating separators 24, the ceramic retention material 28 wraps over the sides of the reactor stack over the plates 12, 14 and onto the top and bottom of the permanent pleated insulating separators 24 in a manner sufficient to firmly compress the plates 12, 14 on the separators 24 to obtain a spacing (exhaust passage 20 height) between opposing polarity plate pairs 12, 14 determined by the thickness of the folded spacers 24.

Figure 9:
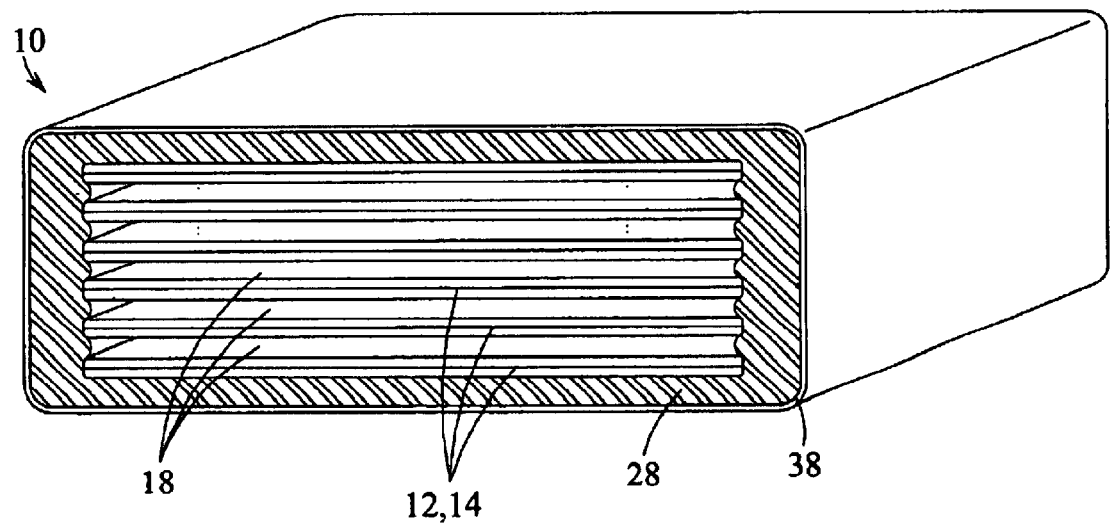
FIG. 9 shows a perspective view of a reactor subassembly, in accordance with a third embodiment of the present invention, wherein the reactor plates are supported by a retention mat.

In FIG. 9, a reactor subassembly in accordance with a third embodiment of the present invention is provided wherein the retention mat 28 secures the stacked plates 12, 14 in place. In this embodiment, an alternating sequence of positive and negative pairs of reactor plates 12, 14 are stacked to form a reactor stack having exhaust gas passages 20 defined between opposing pairs of plates 12, 14, using temporary spacers 16 between opposing polarity pairs of said positive and negative reactor plates 12, 14 to support the stacked plates 12, 14 during preparation. A retention material 28, such as a ceramic fiber retention mat, is disposed about the stack. In this embodiment, permanent support for the stacked plates 12, 14 is supplied from the retention mat 28, which, upon compressing, extends slightly into the exhaust gas passages 20 at each side of the stack. Suitable electrical connections are applied to the reactor plates 12, 14 prior to wrapping, and the wrapped stack inserted into a reactor housing 38. Optionally, a rigid plate, such as a mica plate, is disposed at top and bottom ends of the reactor.

The present non-thermal plasma reactor having individually retained positive and negative reactor plates and method for preparing same advantageously provides ease of manufacture and improved reactor performance.

The present NTP reactor and method advantageously eliminates the use of permanent ceramic spacer plates and edge assembly retention with glass cement. By retaining the plates with a pair of insulating layers or permanent insulating separators disposed on either side of the reactor stack, the present reactors are provided at greatly reduced costs over comparable reactors using many individual spacers.

The present NTP reactor and method advantageously improves dimensional control of the spacing of the sandwiched plates without permanent spacers, thus reducing the occurrence of "dark" cells.

The present NTP reactor and method advantageously provides improved insulation and reduces the width of the insulated area while providing insulating capacity similar to more fully insulated reactors.

The present NTP reactor and method for preparing a non-thermal plasma reactor advantageously improves dimensional control over stack height by providing close dimensional control of the spacer plates using temporary spacers that are removed after reactor assembly.

The present NTP reactor and method for preparing a non-thermal plasma reactors advantageously provide enhanced durability over previous rigid, one piece reactors that are susceptible to breaking of the rigid stack or cracking of the glass cement during assembly or during operation.

The present NTP reactor and method for preparing a non-thermal plasma reactor advantageously reduces the possibility of reactor plate breakage induced by thermal stress during operation by allowing each plate to expand or contract independently from the other.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A non-thermal plasma reactor having individually retained plates comprising:
   a housing containing a stack comprising an alternating sequence of pairs of positive and negative reactor plates;
   exhaust gas passages defined between said pairs of positive and negative plates by folds of an insulating layer disposed on each side of said stack, said folds of said insulating layer extending into said exhaust channels, said exhaust gas passages being free of permanent individual ceramic spacers;
   an insulating retention material wrapped around said stack;
   suitable electrical connections provided to said plates;
   suitable inlet and outlet connections provided to said housing;
   wherein said reactor plates are secured by said insulating layer enabling individual pairs of said plates to expand or contract independently of one another during operation.

2. The reactor of claim 1, wherein said insulating layer comprises an insulating ceramic fiber material or a green layer of tape cast ceramic material.

3. A non-thermal plasma reactor having individually retained plates comprising:
   a housing containing a stack comprising an alternating sequence of pairs of positive and negative reactor plates defining exhaust gas passages between said pairs of positive and negative plates;
   permanent pleated insulating separators disposed on each side of said stack; wherein pleats of said permanent pleated insulating separator extend between opposing pairs of said plates defining said exhaust passage height, said exhaust gas passages being free of permanent individual ceramic spacers;
   an insulating retention material wrapped around said stack;
   suitable electrical connections provided to said plates;
   suitable inlet and outlet connections provided to said housing;
   wherein said reactor plates are secured by said insulating retention material in combination with said permanent pleated insulating separators enabling individual pairs of said plates to expand or contract independently of one another during operation.

4. The reactor of claim 3, wherein said ceramic retention material extends over sides of said reactor to partially cover reactor top and bottom surfaces, said ceramic retention material resiliently compressing said plates against said permanent pleated insulating separators.

5. The reactor of claim 3, wherein said permanent pleated insulating separators comprises a pair of separators each having a plurality of pleats, one member of each pair being disposed on each side of said reactor.

6. The reactor of claim 3, wherein said permanent pleated insulating separators comprise a plurality of discrete pleated separators disposed between said plate pairs.

7. The reactor of claim 3, wherein said retention material extends over sides of said reactor, partially covering top and bottom surfaces of said reactor, said retention material resiliently compressing said plate pairs against said permanent pleated insulating spacers.

8. The reactor of claim 3, wherein said permanent pleated insulating separator comprises mica, mica sheet, tape-cast ceramic material in the "green" state, or molded rigidized ceramic fiber.

9. The reactor of claim 3, further comprising:
   a rigid ceramic insulating filler disposed at top and bottom ends of said stack plates.

10. A non-thermal plasma reactor having individually retained plates comprising:
    a housing containing an alternating sequence of pairs of positive and negative reactor plates forming a stack;
    exhaust gas passages defined between said pairs of positive and negative plates, said exhaust gas passages being free of permanent individual ceramic spacers;
    an insulating retention material wrapped around said stack and extending into said exhaust gas passages at opposite sides of said stack;
    suitable electrical connections provided to said plates;
    suitable inlet and outlet connections provided to said housing;
    wherein said reactor plates are secured by said insulating retention material enabling individual pairs of said plates to expand or contract independently of one another during operation.

11. The reactor of claim 10, further comprising:
    a rigid plate disposed at top and bottom ends of said stacked plates.

12. The reactor of claim 11, wherein said rigid plate is a mica plate.

* * * * *